United States Patent
Casada

Patent Number: 5,374,221
Date of Patent: Dec. 20, 1994

[54] POSITIVE VARIABLE DRIVE TRANSMISSION UNIT/SYSTEM

[76] Inventor: James F. Casada, Rte. 2, Box 451-4, Bristow, Okla. 74010

[21] Appl. No.: 805,981

[22] Filed: Mar. 2, 1992

[51] Int. Cl.⁵ .............................................. F16H 9/18
[52] U.S. Cl. ........................................ 474/29; 474/83
[58] Field of Search ............... 474/28, 34, 49, 83, 474/29; 74/191, 192, 339; 192/53 F, 114 T; 475/206

[56] References Cited

U.S. PATENT DOCUMENTS

| | | | |
|---|---|---|---|
| 510,283 | 12/1893 | McIntyre | 474/29 |
| 641,281 | 1/1900 | Edison et al. | 474/25 |
| 902,224 | 10/1908 | Fouillaron | 474/201 |
| 1,350,670 | 8/1920 | Ritter | 474/37 |
| 1,601,662 | 9/1926 | Abbott | 474/29 |
| 1,966,831 | 7/1934 | Oakes et al. | 474/40 |
| 2,107,483 | 2/1938 | Knight | 474/46 |
| 2,264,178 | 11/1941 | Jensen | 474/36 X |
| 2,591,746 | 4/1952 | Tom | 474/27 X |
| 2,594,663 | 4/1952 | Lindell | 474/27 |
| 3,628,389 | 12/1971 | Wiegelmann et al. | 474/19 |
| 3,704,634 | 12/1972 | Schrodt | 474/18 |
| 4,781,656 | 11/1988 | Brackett et al. | 474/29 |

FOREIGN PATENT DOCUMENTS

| | | | |
|---|---|---|---|
| 16744 | 12/1896 | United Kingdom | 474/204 |

*Primary Examiner*—Roger J. Schoeppel

[57] ABSTRACT

A set of interlocking sheaves having fan-shaped protruding curved surfaces of different conical angles and capable of varying their degree of interlock is used in conjunction with a drive line to provide a variable drive transmission system having a positive gear-like gripping action between the drive line and the sheaves, the improvement allowing increased drive line traction and noise reduction.

21 Claims, 12 Drawing Sheets

POSITIVE VARIABLE DRIVE TRANSMISSION UNIT/SYSTEM

Background—Field of Invention

This scope of this application basically covers four areas: the basic unit (based on the existing prototype), variations on the basic unit, a control system, and possible future applications. Most of the claims made are fundamentally based on prior art, with unique design applications involving substantial improvements and innovations.

Note: the term "sheave" is used in this report to describe a single conical piece, while the term "unit" consists of two or more sheaves on a single shaft, usually forming a "pulley".

Background—Description of Prior Art

Two fundamental concepts to the Positive Variable Drive Transmission Unit (PVD unit) are previously established by prior art. The basic concept of using intermeshing sheaves to form a variable drive pulley has been around at least since 1919 (U.S. Pat. No. 1,350,670). Since that time, there have been many variations using different spacings and configurations of intermeshing members, belts, control systems, etc. Applications generally have fallen into two areas: mechanical power transmission and feed control (mainly in textiles).

The second basic concept is that of using a drive line designed to interlock with the sheave contact surface, usually by a means of recesses or grooves located radially along contact surface faces of an otherwise standard variable pulley (the term "standard variable pulleys or sheaves" is used for those types that do not intermesh the sheaves into each other). This type of arrangement has been around at least since 1924 (U.S. Pat. No. 1,601,662). Since then, various drive line configurations have been developed, although the sheave design itself seems to have changed very little. Application of this design has basically been limited to mechanical power transmission, due to the specialized nature of the drive line.

The combination and application of elements from these two approaches to variable drives is important to my claims 1 through 5.

As for prior art concerning configuration of the contact surface areas of sheave itself, I can not find anything that would provide a true interlocking gripping action with the drive line, other than what I have mentioned in the preceding paragraph. Also, I have found nothing that alters the basic conical angle of the sheave itself or combines sheaves of different conical angles to form a unit. Most of what I have found pertains to either increasing the coefficient of friction of the contact surface or to reduce noise. My claims 11 through 21 relate to these various elements of the sheave contact surface areas.

The mounting of the sheaves upon a keyed or splined shaft is common on standard variable pulleys, although it is really not necessary on intermeshing sheaves. The closest patent that I have found (U.S. Pat. No. 4,781,656) using a splined shaft on a intermeshing sheaves, seems to use it mainly as a "way" surface for the intermeshing members to ride on. I would prefer a full length splined surface to precisely maintain enough clearance between the intermeshing members to prevent any binding with the interconnecting members of the drive line and to equalize torque stresses to both sheaves in a unit.

Arranging units whereas one unit serves as a driver and another unit is driven ("master" and "slave" units) has been very common in the past. Often a third or fourth unit has been added in a series to increase the overall ratio range of a system. As for the parallel use of slave units, the only prior art that I know of involves non-variable units, such as commonly referred to as a power take-off application. In my claim 14, the number of slave units that can be powered from a master unit is unimportant. This claim would pertain only to applications requiring variable differentiation between slave units.

As for the control system that I have claimed in 6, 7 and 15, many control systems have been designed to vary transmission ratio range in relation to input/output load or RPM. I have found no prior art that would control a variable unit in relation to a linear or circumferential movement, although there are probably some numerical controlled machines that can be programed to do so on a particular job.

OBJECTS AND ADVANTAGES

Variable speed drives mainly fall into three basic types: electrical, fluid, and mechanical. The PVD is a mechanical based unit using a line drive (constant speed type transmission). Specifically, this is a design based on mechanically changing the effective pitch diameter by varying two or more sheaves that form conical shaped valleys (like a pulley) for transmitting, carrying, or receiving a drive line. This is accomplished by a mechanism that controls the setting of the sheaves as they are moved axially toward or away from each other on a shaft.

Standard variable pitch drive units currently in use tend to have one consistent design problem to overcome: that is, in order to obtain a drive train value range of greater than 1:2, either the drive line (usually a belt) is widened or the conical valley angle ("vee-angle") is reduced. Complications arising from extra wide drive lines range from excessive centrifugal forces and buckling stresses to more expensive replacement costs. Narrow vee-angles increase the wedging action upon the drive line, increasing friction and wear. Most variable pitch units used today are limited to less than a 1:4 ratio range.

Intermeshing sheave units avoid difficulties involving wide drive lines and narrow vee-angles, but tend to have their own unique design problems. Most intermeshing type sheaves (including my prototype) use evenly spaced cavities located radially about the contact surface that allow the sheaves to slide axially into each other, although other configurations are possible. Typically, on an intermeshing sheave unit, only one side of the sheave is in contact with the drive line anywhere along the vee-angle area. This results in a loss of the wedging action on drive line, which increases slippage in higher power applications. Also, this intermittent sheave contact can result in an excessive slapping action on the drive line at the greater pitch diameter settings. Because of this, the existing intermeshing sheave units also tend to be designed for a ratio range of 1:4 or less.

The PVD design combines the advantages of both standard (particularly the positive interlocking drive line type) and intermeshing variable sheave drives, but also includes features to help overcome their inherit design problems. Applications that are particularly suitable for this design are those requiring high power transmission with a wide range of variable ratios. In a motor vehicle application, a single master unit and slave unit should suffice without requiring additional gearing (approximately a 1:10+ range).

Addition "objects and advantages" may be found in the following section as they relate to the various claims.

DETAILED DESCRIPTION

Figure 1:
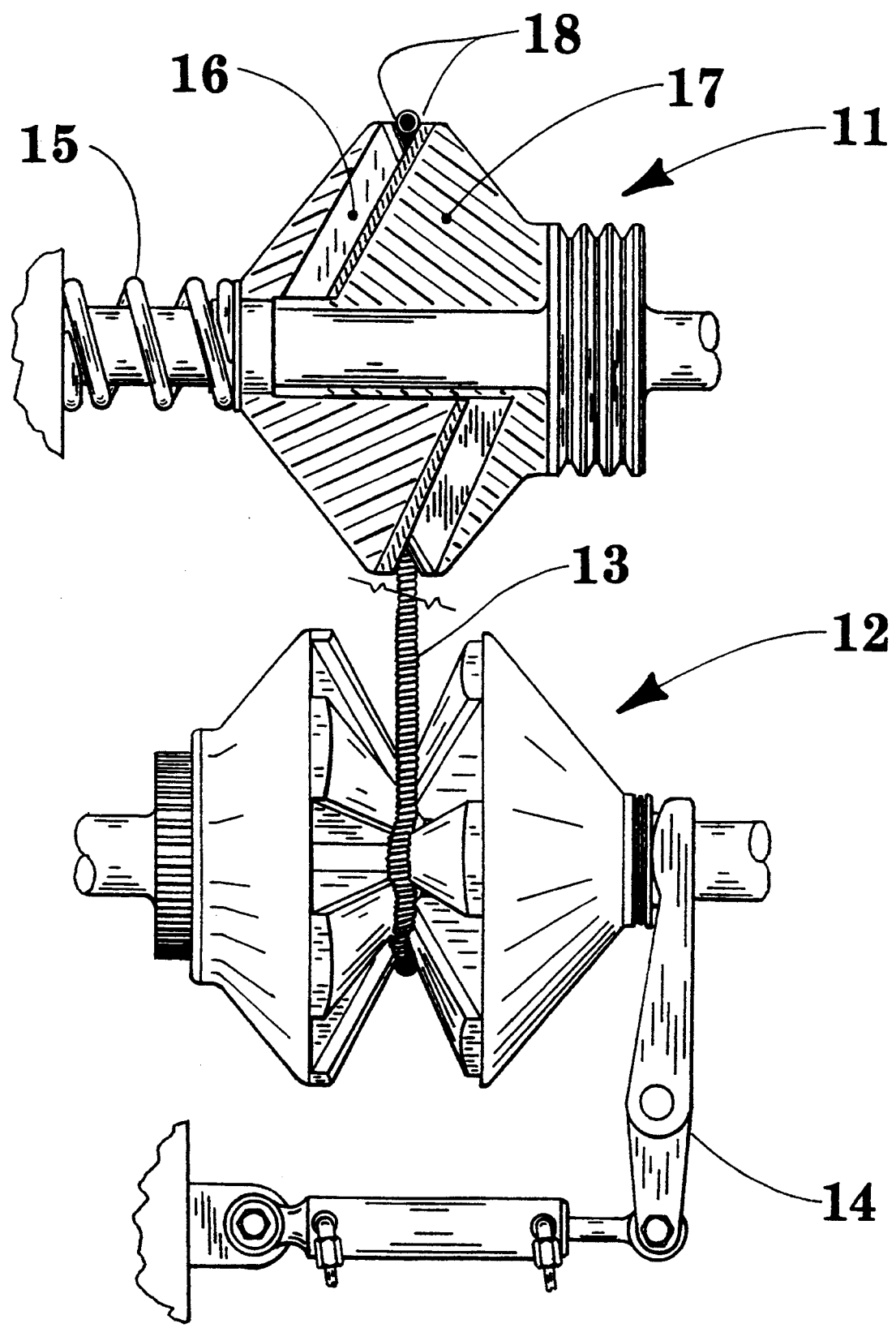
Figure 2:
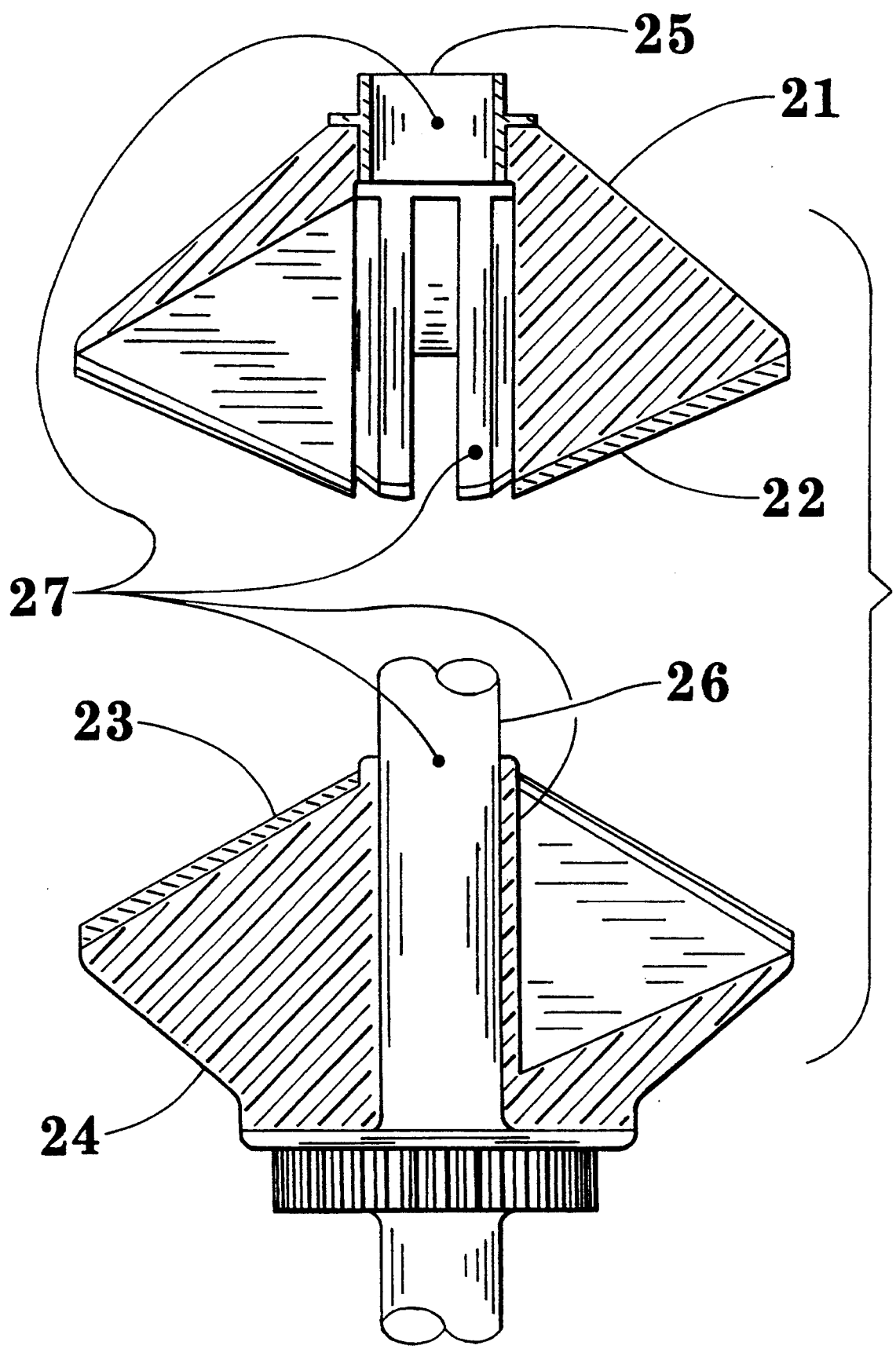

FIGS. 1 and 2 shows a basic PVD prototype unit/system that I have designed and built for use as a main drive transmission on a engine lathe. The sheave bodies were cast of a polyester based thermoset plastic with fiberglass reinforcement. This material was good to work with, keeping in building this project within a reasonable budget, but an injectable thermoplastic (such as nylon) probably would have been better because of its shock absorbing characteristics (claim 14).

Figure 3:
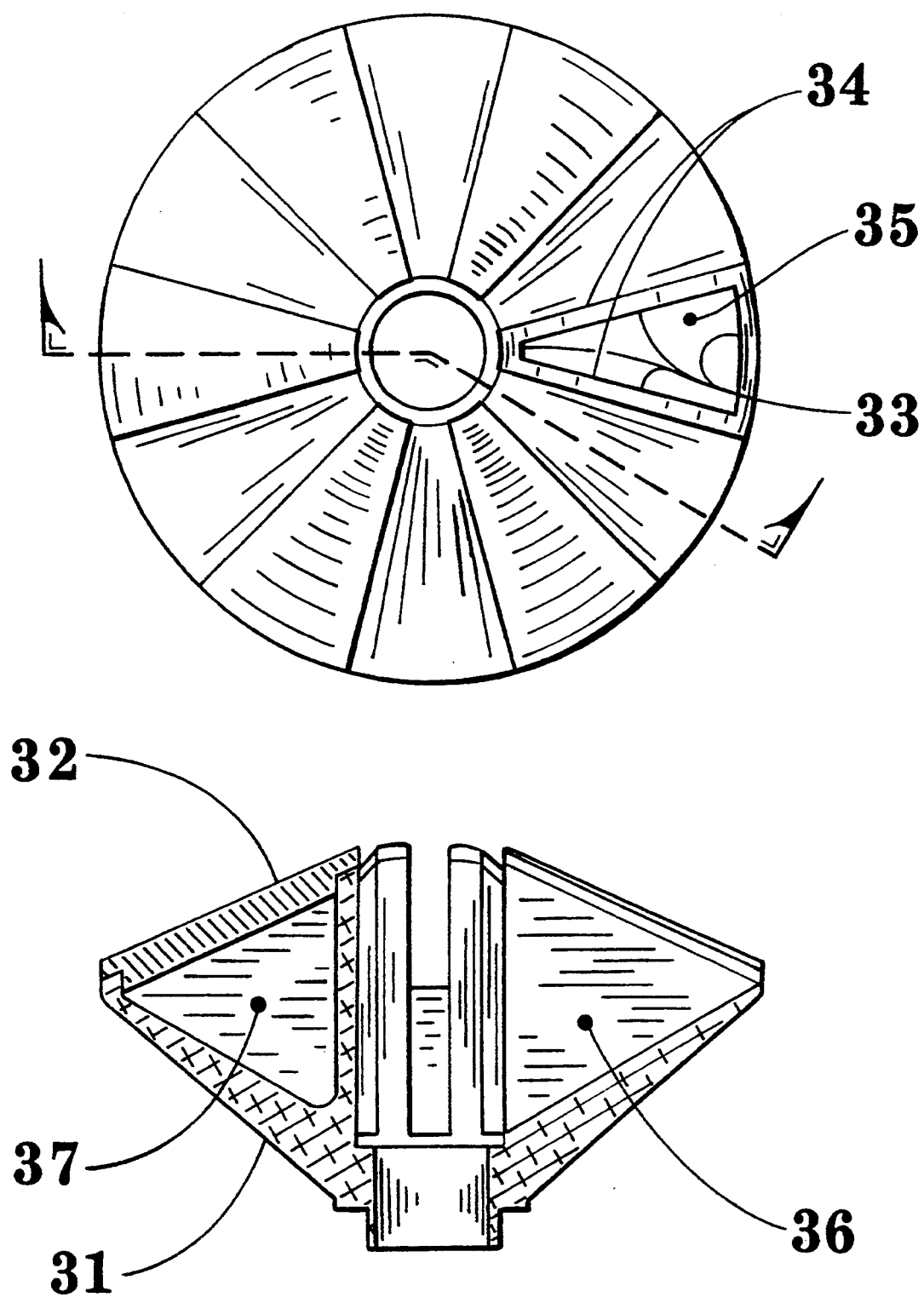
Figure 4:
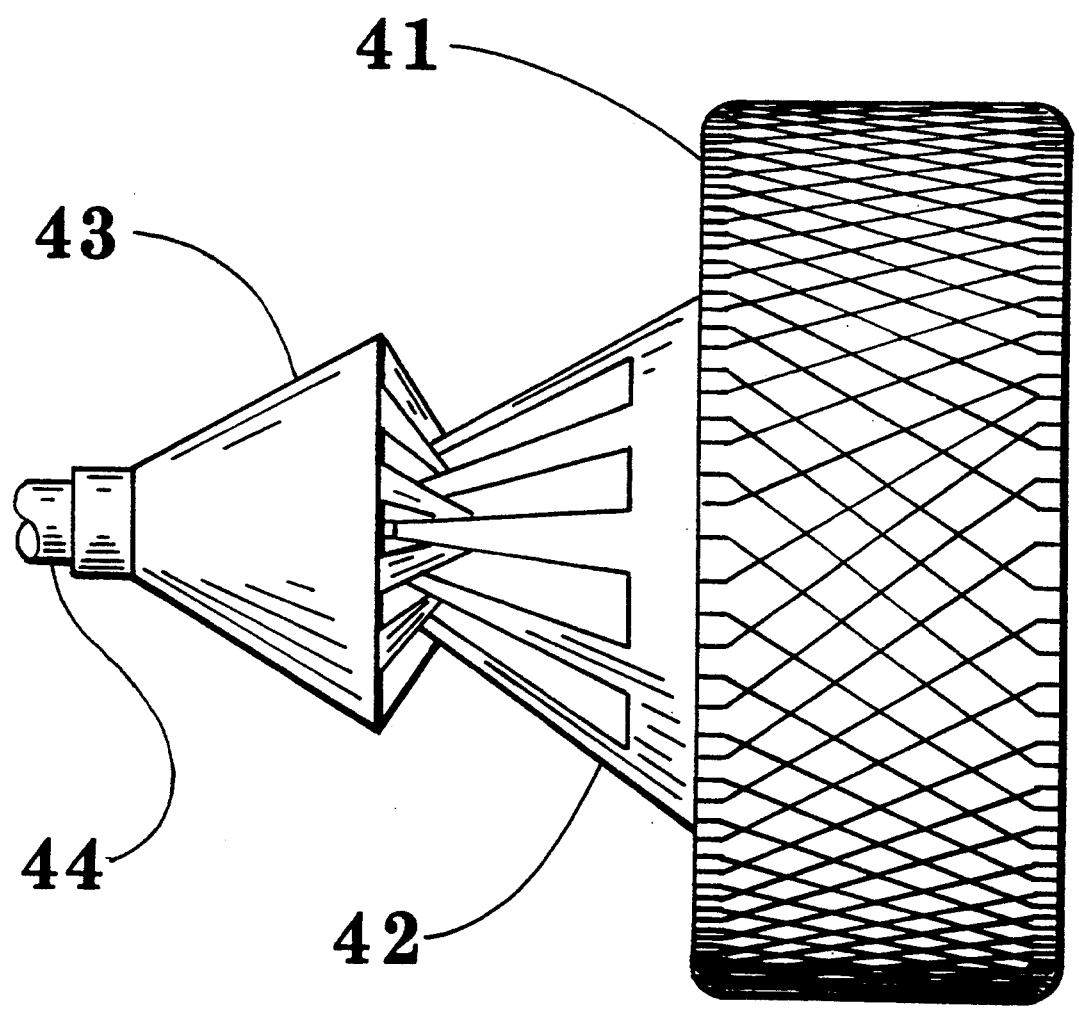
Figure 5:
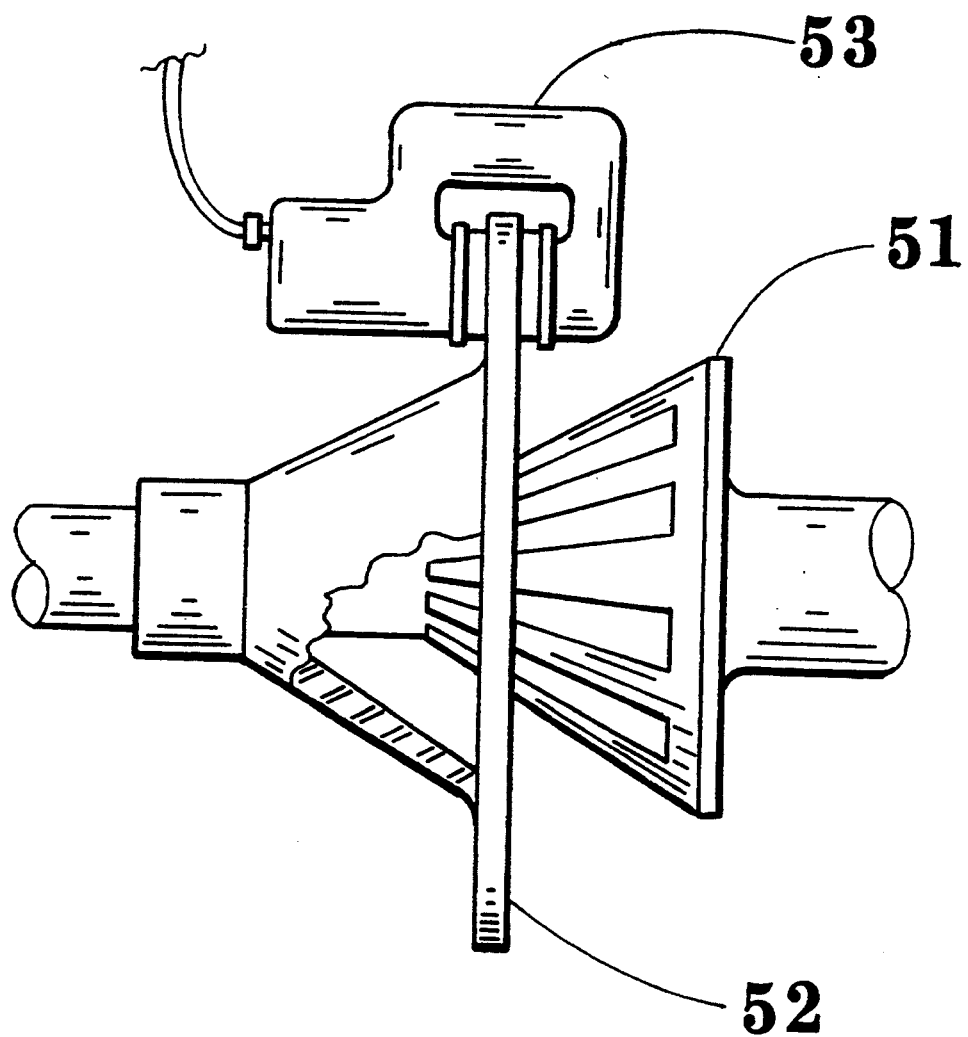

The PVD design also is well suited for a die cast or extruded construction (FIG. 3, claim 15), particularly when using inserted driving contact surfaces (claims 11-13). On a motor vehicle application, the PVD configuration could be cast directly onto the wheel (FIG. 4), Also, this is a good example of where differing conical angles of the sheaves could possibly be used to overcome clearance problems (claims 18-20). On the prototype unit, one sheave was designed with a 10 degree greater conical angle than the other to cause the drive line to slightly rotate during operation, resulting in more even wear about the contact surface of the drive line (claims 18 and 19). Even a flat plate with cavities cut out to suit an intermeshing sheave is also a foreseeable application (FIG. 5). In this case, it would be possible to use this same disk-like plate in a disk brake system (claims 4 and 2).

Figure 6:
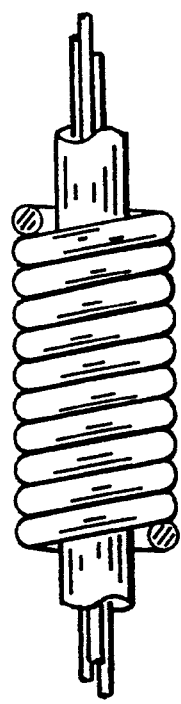
Figure 6:
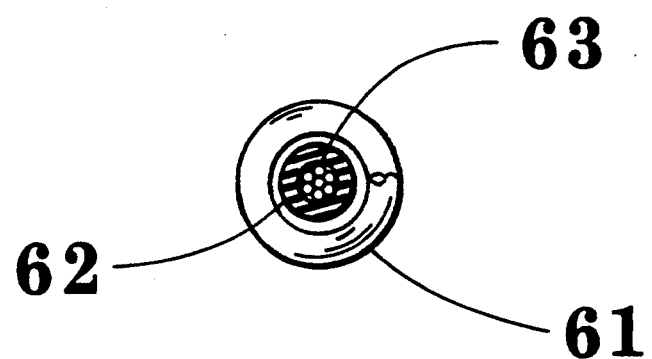
Figure 7:
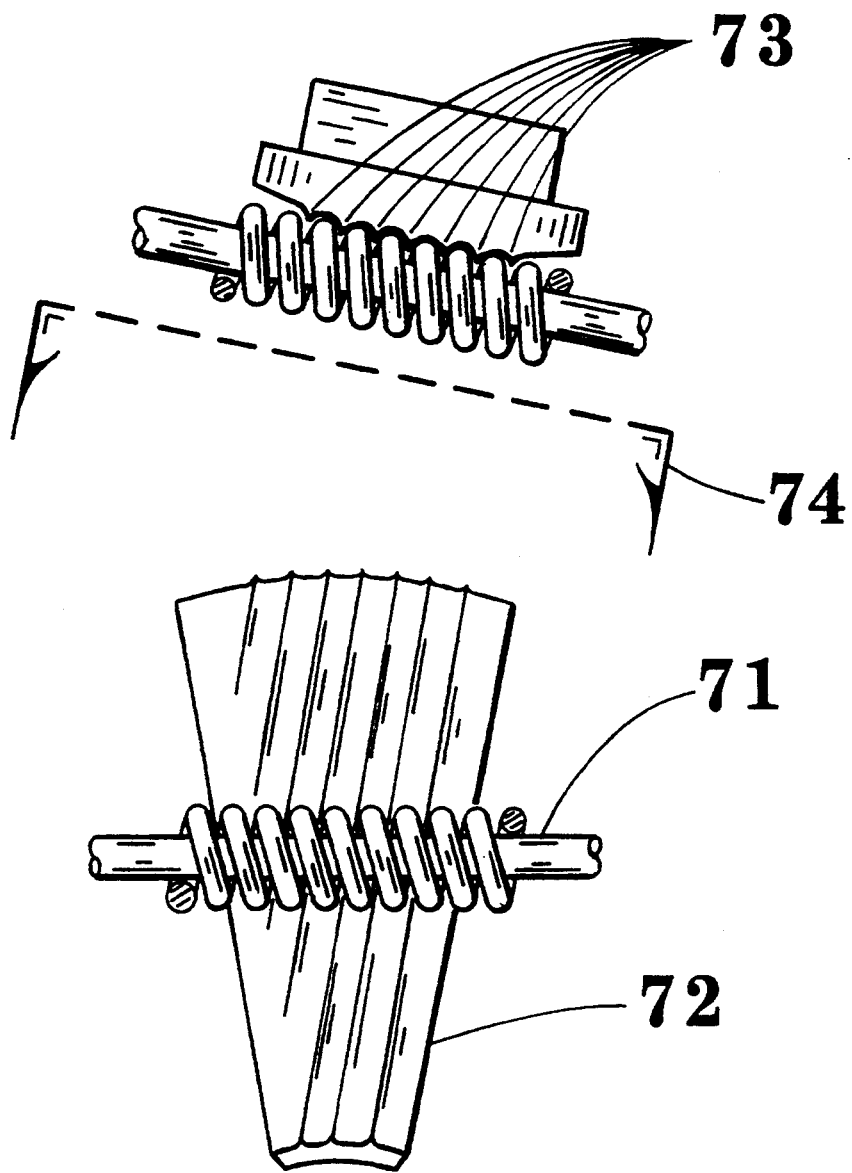

The drive line shown in use in FIGS. 1 and 2 is that of a rubber coated steel cable loosely enclosed by a flexible steel coil (FIG. 6). Positive gripping action is obtained by the flexing of the coil surface into the intermeshing edges of the sheaves (claims 1-5). An improved variation of this design is shown in FIG. 7, whereas the contact surface is modified to provide greater interlocking gripping action (claims 16 and 17). In this case a stiffer, less flexible coil could be used.

Figure 8:
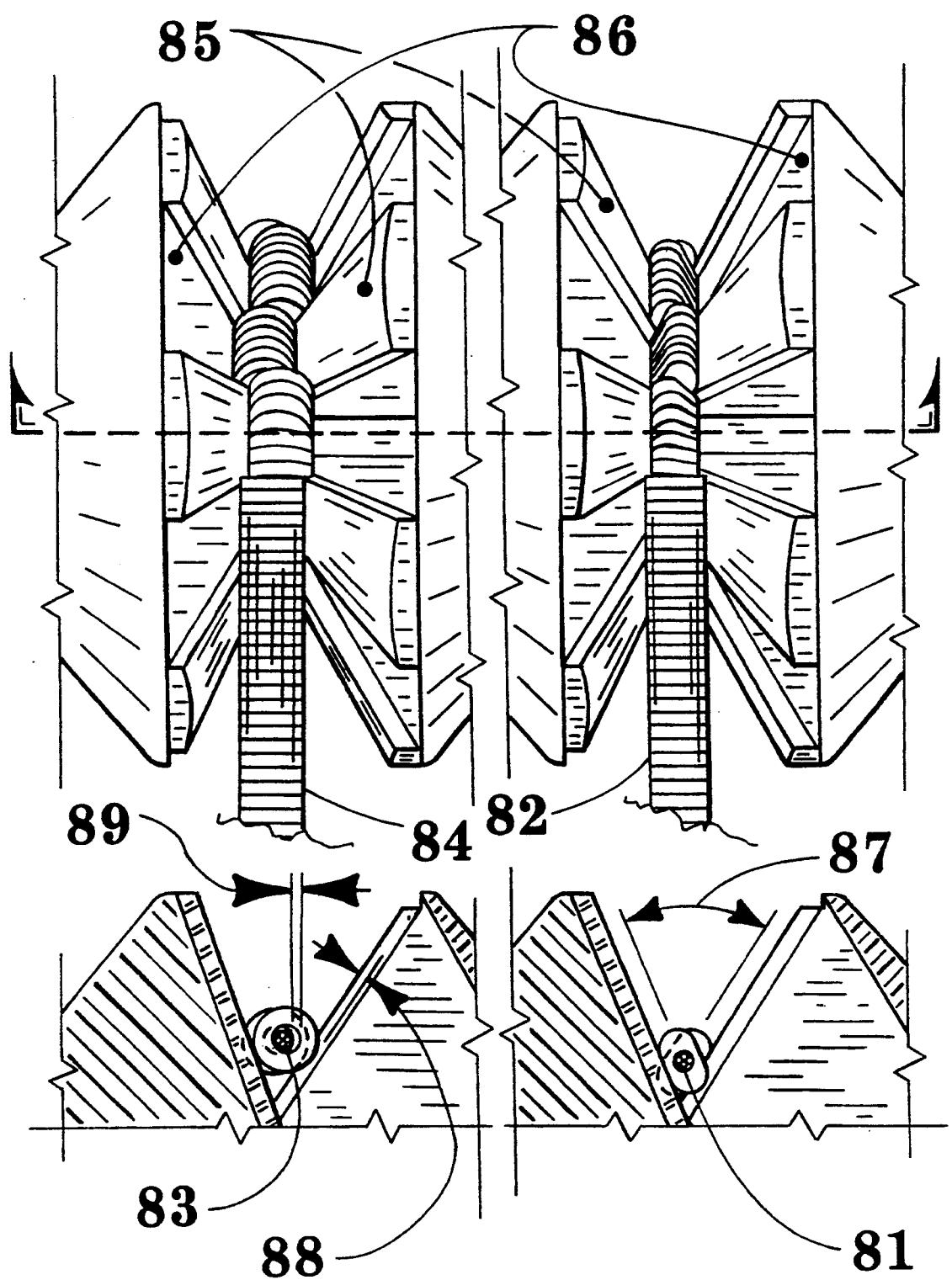
Figure 9:
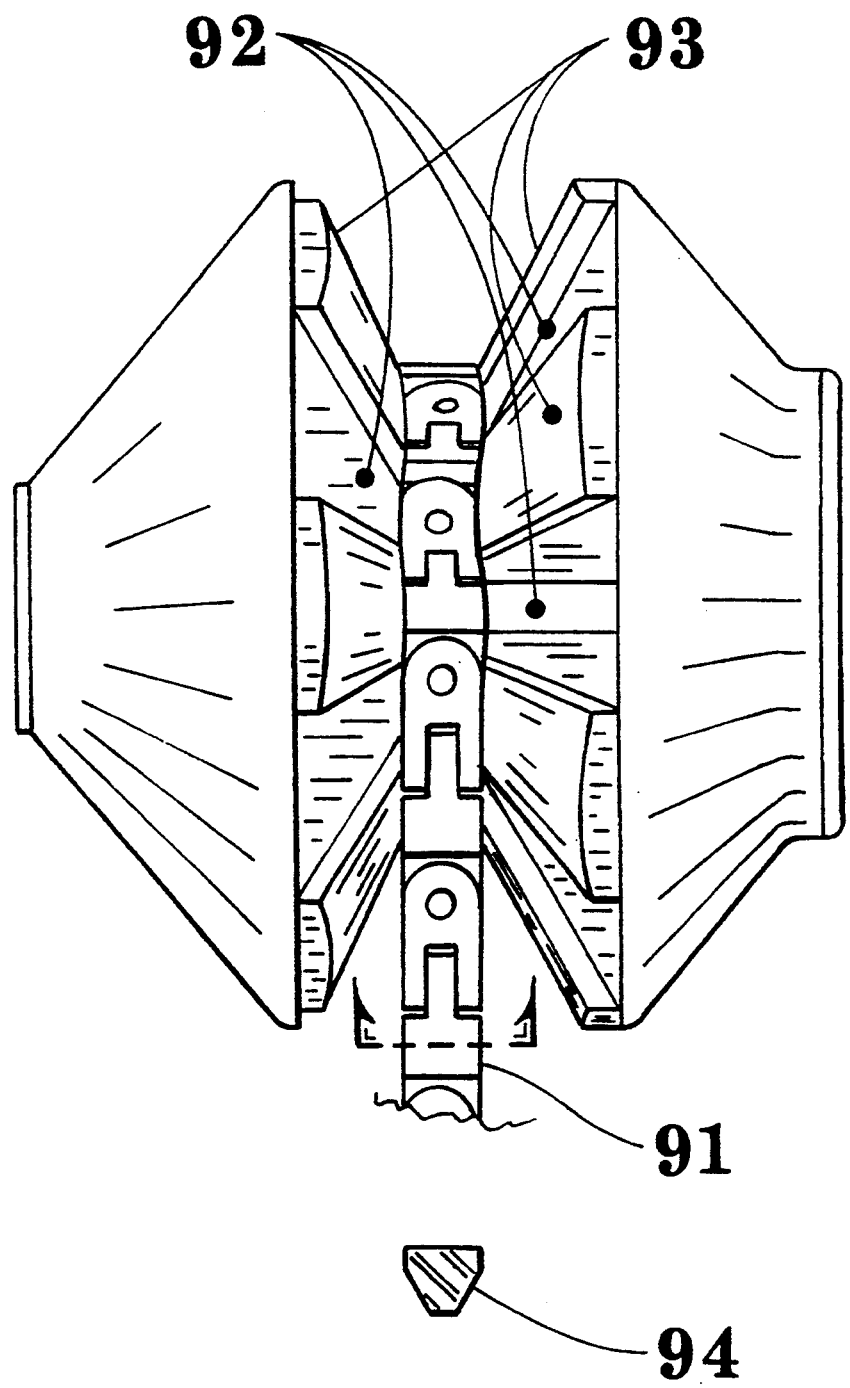

Other drive line designs could include any configuration with elements designed to shift, slide, pivot, or rotate to produce an interlocking a gripping action upon the contact surfaces. FIG. 8 shows some of the other variations possible using plates or washers (claims 1 and 2). FIG. 9 shows a variation using pivoting chain links (claims 1 and 3).

The FIGS. 1 and 2 of the prototype also show the incorporation of removable contact surfaces on the sheaves (claim 11). These are replaceable plates made of steel to provide a durable wear surface on these plastic sheaves (claims 12 and 13). Also, they were designed with a conical radius about 10% smaller than the effective conical pitch radius to help take up excessive slack that could cause a slapping action from the spacing of the intermeshing contact surfaces. This feature permits smoother operation with larger diameter sheaves, allowing a wider variable ratio range of operation.

Figure 10:
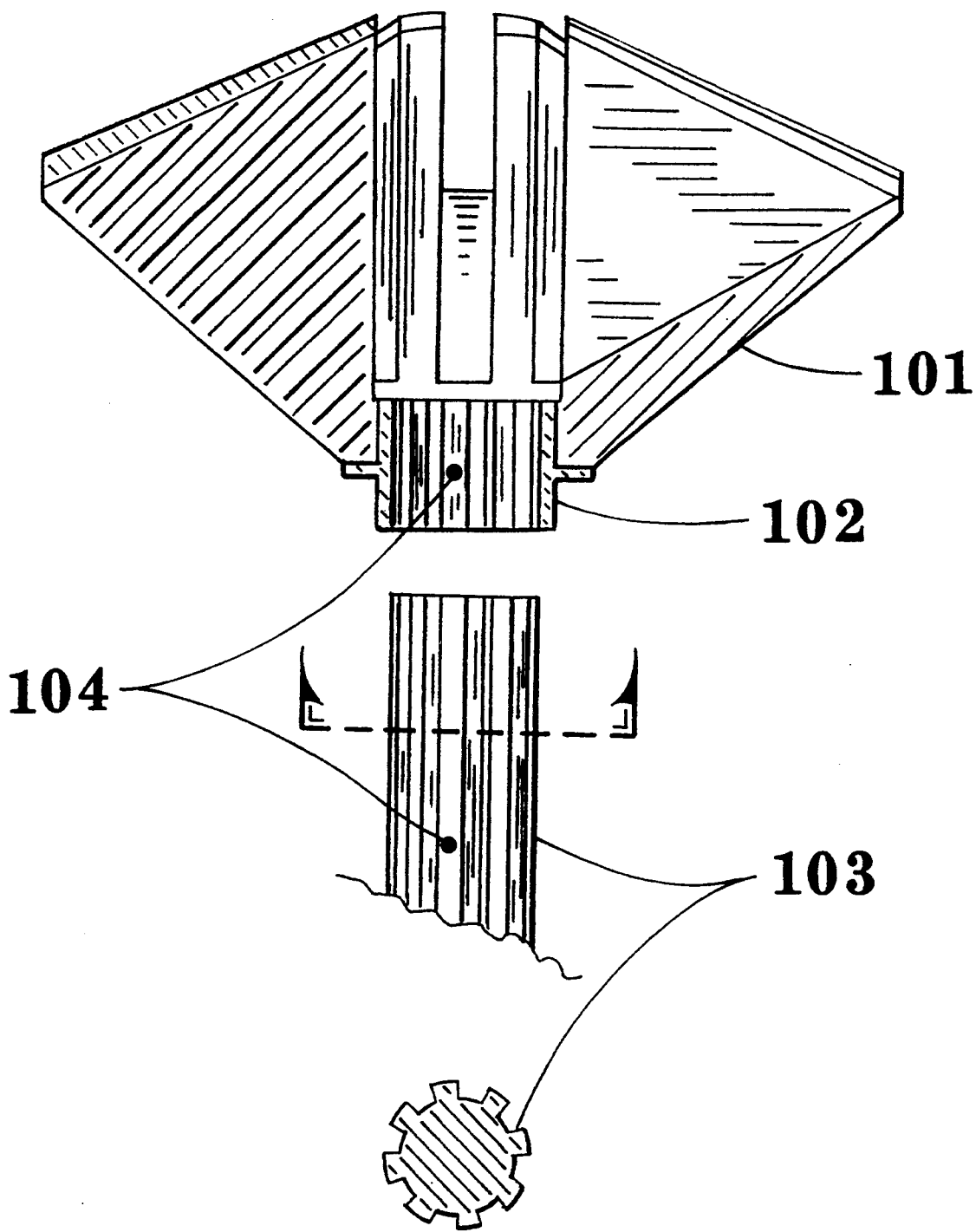

One feature that was not used on the prototype unit, but probably should have been, is to mount the movable sheave on a splined shaft that would extend through at least the hub area (FIG. 10). This would serve to help equalize wear and stresses by accurately controlling sheave clearances of the intermeshing members. On the prototype, these clearances were designed to be rather loose to prevent any binding with the drive line.

Figure 11:
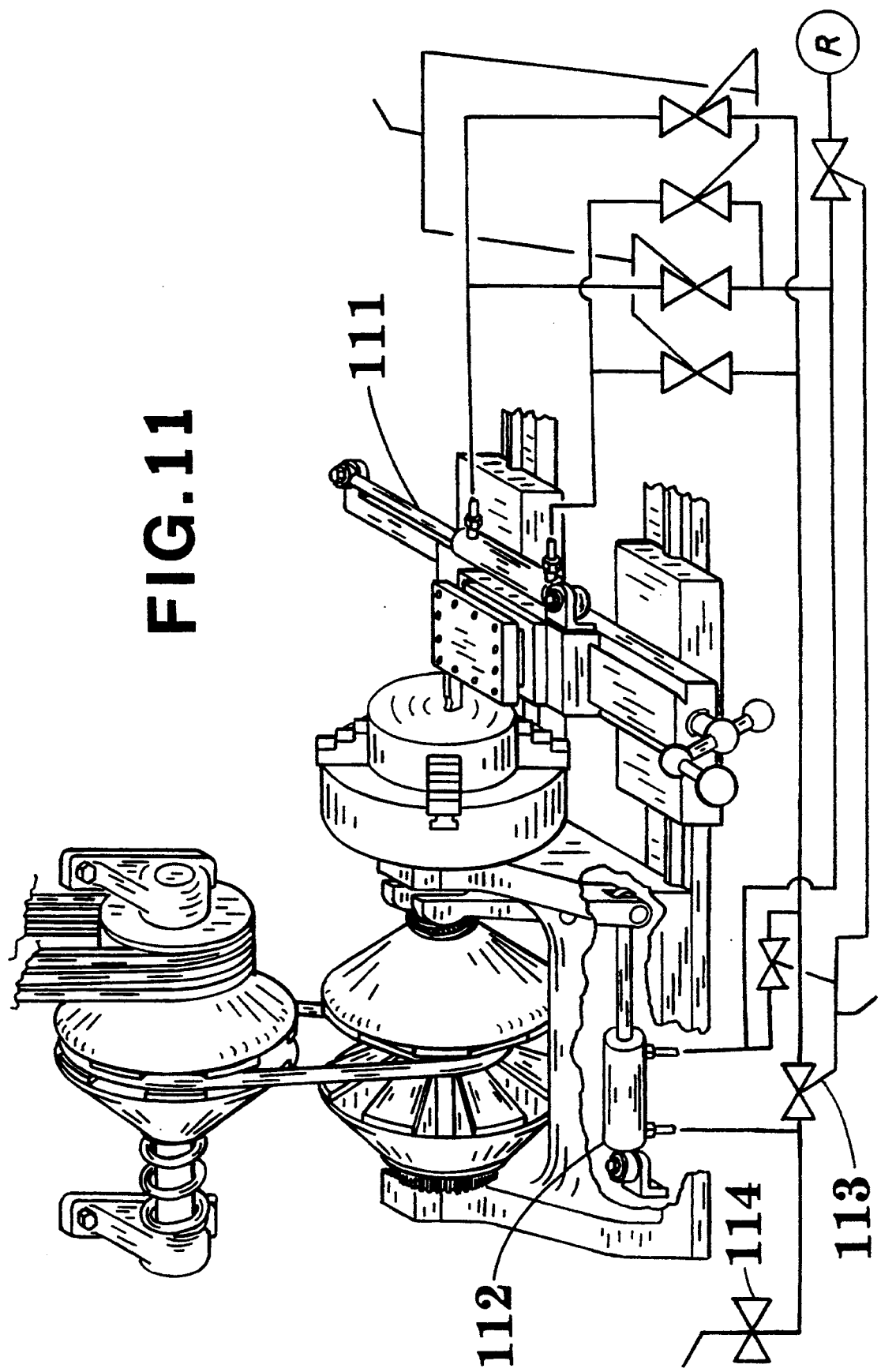

The control system devised to use on the prototype unit (FIG. 11, claims 8 and 9) is design for application on an engine lathe. It automatically changes the chuck speed to maintain a constant circumferential speed on the workpiece at the cutting tool location. For example, if you were to take a long "facing cut" on a large diameter workpiece, you would begin the cut on the larger outside diameter at a slow RPM, but as your cut moves inward to a smaller diameter of cut, the RPM would automatically increase to maintain a constant circumferential rate. On a workpiece with many different diameters, this would save much time that would normally be required to stop and change speeds.

Much in this same manner, a similar control system could be designed to control the RPM and maintain a constant stroke rate even when the stroke length is varied (claims 8 and 9). For example, this could be applied to a variable stroke engine or compressor to control the piston speed, or to maintain a constant cutting rate on a shaper machine.

Figure 12:
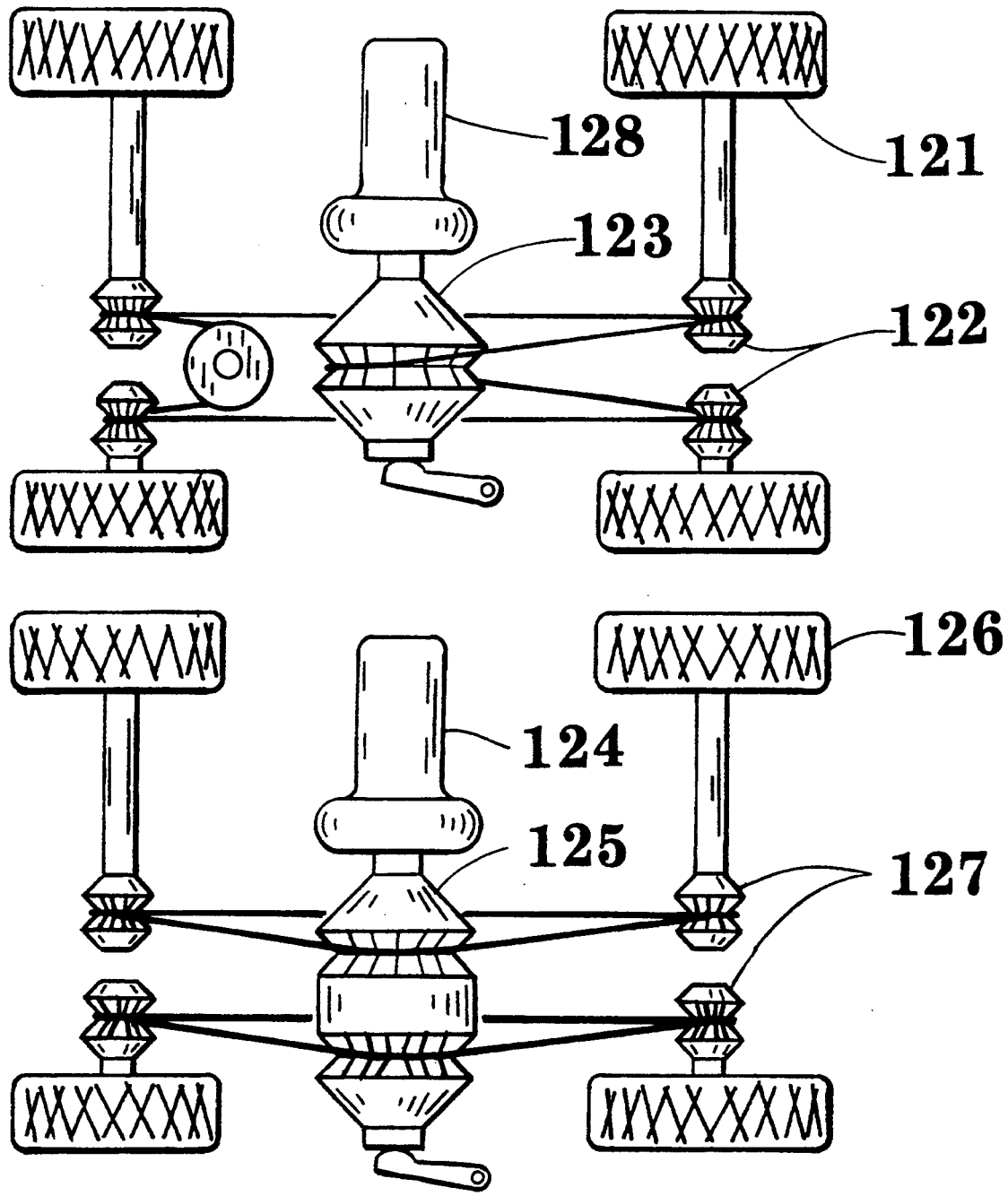

Finally, the application of PVD units by the means of a master and multiple slave units could be very useful in applications requiring automatic differentiate coupling between the slave units (claims 6 and 7). Since slave units are to be spring loaded, as one of them encounters more load than the other, it would tend to move to a larger effective pitch diameter setting, causing the other slave unit(s) to speed up due to the greater tension in the drive line. FIG. 12 is a proposed layout of two methods that this could be accomplished on a four wheel drive vehicle; one uses one master with four slaves and the other uses a double master unit with a free floating center sheave and two slaves on each system. Although standard type sheaves could also be used in such layouts, the PVD system would be much better suited because of the smaller width drive line and the wider variable ratio range.

DRAWING FIGURES

FIG. 1: Basic Units and System Assembly
FIG. 2: Master Unit Details
FIG. 3: Die Casted Sheave Design (Movable Side)
FIG. 4: Sheave Casted Directly to Wheel Hub Unit
FIG. 5: Tapered Sheave With Flat Sheave Unit
FIG. 6: Coiled Drive Line
FIG. 7: Coiled Drive With Matching Contact Surface
FIG. 8: Drive Line With Plates or Washer
FIG. 9: Drive Line With Chain Links
FIG. 10: Splined Shaft Application
FIG. 11: Hydraulic Lathe Control System
FIG. 12: Motor Vehicle Applications

LIST OF DRAWING REFERENCE NUMERALS

11 Master Unit Assembly (Driver)
12 Slave Unit Assembly (Driven)
13 Drive Line (Flexible Coil Type)
14 Control Mechanism Arm
15 Spring
16 Intermeshing Cavity Area
17 Intermeshing Element Area
18 Contact Services
21 Movable Sheave Body
22 Contact Surface Plate (Movable Side)

23 Contact Surface Plate (Fixed Side)
24 Fixed Sheave Body
25 Hub Insert
26 Shaft
27 Sliding Surfaces
31 Sheave Body
32 Contact Surface Insert (Press Fit Or Pinned)
33 Inside Surfaces Drafted
34 No Or Little Draft Angle On Outside Surfaces
35 This Area Shown With Insert Removed
36 Sheave Intermeshing Cavity Area
37 Sheave Intermeshing Element Area (Hollow)
41 Tire And Wheel
42 Fixed Sheave In Wheel Hub
43 Movable Sheave
44 Axle Shaft
51 Fixed Tapered Sheave
52 Movable Flat Plate Sheave
53 Optional Disk Brake
61 Outer Contact Coil
62 Reinforced Rubber Liner
71 Wide Spaced Coiled Drive Line
72 Sheave Contact Surface Plate
73 Grooved Surface To Suit Pitch Of Drive Coil
74 Projection View Is Taken In Line With Coil Slant, Which Also Is In Line With Grooves
81 Inner Cable Core
82 Shaped Washers (Oblong, Triangular, Etc.)
83 Inner Cable Core
84 Round Washers
85 Sheave Contact Surface Areas
86 Sheave Cavity Areas
87 Contact Made By Rotating Action
88 Contact Made By Shifting Action
89 Clearance For Shifting Action
91 Universal Chain
92 Sheave Cavity Area
93 sheave Contact Areas
94 End View Of Universal Chain
101 Sheave Body
102 Hub Insert
103 Splined Shaft
104 Splined Areas
111 Master Cylinder
112 Slave Cylinder
113 Over-ride Valve
114 Manual Controller/Automatic Fine Adjuster
121 Wheel
122 Slave Units
124 Engine
125 Double Drive Master Unit
126 Wheel
127 Slave Units
128 Engine

What is claimed is:

1. A positive variable drive transmission system which comprises:
   a. at least one pair of opposed conical sheaves, each sheave having a series of spaces, wherein said sheaves are mounted on or about a shaft, each sheave having a series of fan-shaped driving contact surfaces wherein each has a curved protruding surface;
   b. means to vary said sheaves axially on said shaft, so that one said sheave will intermesh and fit in the spaces of the other said sheave to provide an adjustment to change the effective circumference of a conical shaped valley;
   c. a drive line engagable with said conical shaped valley near the intersection of said sheaves; and
   d. means to create a positive, gear-like gripping action and traction between said drive line and said sheaves.

2. A positive variable drive transmission system as set forth in claim 1 wherein said drive line includes a plurality of aligned plates or washers stacked or positioned around an axial core driving line element so that said plates or washers will shift, slide, pivot or rotate in order to grip said sheaves.

3. A positive variable drive transmission system as set forth in claim 1 wherein said drive line includes chain links designed to shift, slide, pivot or rotate in order to grip said sheaves.

4. A positive variable drive transmission system as set forth in claim 1, including braking means to apply a frictional force directly to a surface of at least one sheave.

5. A positive variable drive transmission system as set forth in claim 1 wherein said drive line includes flexible or spring designed flexible material so as to grip said sheaves.

6. A positive variable drive transmission system as set forth in claim 1 wherein at least one of said pair of opposed sheaves is arranged so that one said sheave is a master and one said sheave is a slave.

7. A positive variable drive transmission system as set forth in claim 6, wherein said system is used in a motor vehicle and provides automatic differentiation on each drive wheel of said motor vehicle to allow each drive wheel to rotate at a different speed.

8. A positive variable drive transmission system as set forth in claim 1, including control means to adjust axial settings of said sheaves in relation to a linear or circumferential rate movement.

9. A positive variable drive transmission system as set forth in claim 8, including a power source that uses a variable length stroke piston or cyclodic linear mechanism so that the stroke velocity could be maintained at a desired rate.

10. A positive variable drive transmission system as set forth in claim 8, wherein said system is used in a lathe or other machine and performs work upon work pieces with various diameters and means to maintain the circumferential speed at a desired rate.

11. A set of intermeshing sheaves that form effective conical shaped valleys for transmitting, carrying, or receiving a drive line, wherein said sheaves are mounted on a shaft as to be variable axially to provide an adjustment to change the effective circumference to the said line, wherein an improvement comprises:
   driving contact surfaces in the form of a coating, inserts, or plates mounted upon the sheave surfaces.

12. A set of intermeshing sheaves as set forth in claim 11, wherein said contact surface material is of a material different than the material used for the sheave body.

13. A set of intermeshing sheaves as set forth in claim 11, wherein said contact surface is removable and replaceable without having to remove or replace the entire sheave.

14. A set of intermeshing sheaves as set forth in claim 11 wherein each said sheave is constructed of a plastic material in order to reduce centrifugal stresses, increase shock absorbing characteristics, and add to the ease of manufacture.

15. A set of intermeshing sheaves as set forth in claim 11 wherein each said sheave is made of a die castable material, such as aluminum or zinc, to reduce centrifugal stresses, increase strength, and add to the ease of manufacture.

16. A set of intermeshing sheaves that form effective conical shaped valleys for transmitting, carrying, or receiving a drive line wherein said sheaves are mounted on a shaft as to be variable axially to provide an adjustment so as to change the effective circumference to the said line, wherein an improvement comprises:

each sheave having a series of fan-shaped driving contact surfaces, each fan-shaped surface having a series of radial conical-shaped grooves with grove center lines located differently in relation to the shaft axis and to each of the other driving contact surfaces to enhance the gripping action of the drive lines with said sheaves.

17. A set of intermeshing sheaves as set forth in claim 16 wherein each said fan-shaped driving contact surface has a curved protruding surface.

18. A set of intermeshing sheaves that form effective conical shaped valleys for transmitting, carrying, or receiving a drive line, whereas the said sheaves are fitted on a shaft as to be variable axially to provide an adjustment means so as to change the effective circumference to the said line, wherein the improvement comprises:

a driving contact surface conical angle on the individual sheaves of the set which are effectively different from one another.

19. A set of intermeshing sheaves as set forth in claim 18 wherein one said sheave has a slightly greater conical angle than the other said sheave to cause said drive line to rotate radially about the axis of said drive line to provide even wear all around the contact surface of said drive line.

20. A driving contact surface conical angle as described in claim 18, whereas one sheave may have less effective conical angle or be effectively flat to suit applicational clearance problems, such as on a motor vehicle application that uses the driven wheel hub in conjunction for a said conical sheave, allowing less clearance area for the matching sheave to be of the same conical angle.

21. A set of intermeshing sheaves as set forth in claim 18 including braking means to apply a frictional force to the surface of at least one sheave and, wherein said flat surface or plate sheave would serve as a braking surface to apply frictional force.

* * * * *